United States Patent [19]

Ando et al.

[11] Patent Number: 4,720,899

[45] Date of Patent: Jan. 26, 1988

[54] METHOD OF MANUFACTURING SCROLL MEMBERS FOR USE IN A ROTARY COMPRESSOR

[75] Inventors: Hiroyuki Ando, Komatsu; Isamu Matsumoto, Ishikawa, both of Japan

[73] Assignee: Kabushiki Kaisha Komatsu Seisakusho, Tokyo, Japan

[21] Appl. No.: 877,641

[22] Filed: Jun. 23, 1986

[30] Foreign Application Priority Data

Jun. 25, 1985 [JP] Japan ................................ 60-136782

[51] Int. Cl.[4] ................................................ B23P 15/00

[52] U.S. Cl. .......................... 29/156.4 R; 29/156.8 R; 29/DIG. 11; 29/DIG. 18; 72/344; 72/354; 72/359; 72/377

[58] Field of Search .................... 29/156.4 R, 156.8 R, 29/DIG. 11, DIG. 18; 72/344, 354, 359, 377, 42

[56] References Cited

U.S. PATENT DOCUMENTS

| | | | |
|---|---|---|---|
| 1,213,878 | 1/1917 | Jacocks | 72/354 |
| 2,369,299 | 2/1945 | Kafowi | 72/344 X |
| 2,629,923 | 3/1953 | Johnson, Jr. | 416/241 R |
| 2,835,960 | 5/1958 | Rork | 416/241 R |
| 3,434,326 | 3/1969 | Serret | 72/359 X |

FOREIGN PATENT DOCUMENTS

| | | |
|---|---|---|
| 57-54220 | 11/1982 | Japan . |
| 59-191578 | 10/1984 | Japan . |
| 59-208186 | 11/1984 | Japan . |
| 60-102243 | 6/1985 | Japan . |

*Primary Examiner*—Howard N. Goldberg
*Assistant Examiner*—Ronald S. Wallace
*Attorney, Agent, or Firm*—Armstrong, Nikaido, Marmelstein & Kubovcik

[57] ABSTRACT

A method of manufacturing a scroll member for use in a rotary compressor has the steps of heating a material which has been preformed into a substantially frustaconical body consisting of a flat upper surface portion provided with a cylindrical projection integrally formed in the center portion thereof and a lower surface portion having a conical surface and a flat projecting surface, and forging the material by a forging apparatus. The heating step comprise a first heating at a temperature in the range from 100° to 200° C. and a second heating at a temperature of 440° C. which is carried out after coating the material with graphite, the coating being applied to the material between the first and the second heatings.

5 Claims, 11 Drawing Figures

4,720,899

METHOD OF MANUFACTURING SCROLL MEMBERS FOR USE IN A ROTARY COMPRESSOR

BACKGROUND OF THE INVENTION

1. Field of the Invention

This invention relates to a method of manufacturing parts for compressors, and more particularly to a method of manufacturing stationary and moving scroll members for use in a rotary compressor.

2. Description of the Prior Art

Most of scroll members for a rotary compressor have so far been manufactured by casting or by joining a plate material to a belt-shaped scroll which has been formed by an extrusion molding as disclosed in Japanese patent laid-open publication No. 59-208186 or by a plastic working as disclosed in Japanese patent Laid-open publication No. 59-191578.

In case of manufacturing such scroll members by casting, the productivity is low; the percentage of occurrence of unacceptable castings is high, and cutting portions are so much that the stocks cannot be finished by machining at one time, therefore, after effecting rough finishing several times, final finishing work is performed. On the other hand, in case of joining the plate material to the scroll, casting or molding is not suitable for mass production of the scroll members because it requires many steps to manufacture.

Recently, as disclosed in Japanese patent Laid-open publication No. 60-102243, a forging process has been employed to manufacture such scroll members. However, because of complicated shape or configuration of the members, it is difficult to manufacture such products with predetermined dimensions. In case of manufacturing by forging, disc-shaped or pan-cake shaped materials has been used, however, there has been a tendency that products manufactured by materials of such a configuration, i.e., scroll members are thin in wall thickness in the scroll portion.

SUMMARY OF THE INVENTION

The present invention has been made in view of the above-mentioned circumstance in the prior art, and has for its main object to provide a method of manufacturing a scroll member for a rotary compressor which enables a material to be forged without causing any portions with reduced wall thickness in the scroll portion.

Another object of the present invention is to provide a method of manufacturing by forging a scroll member for a rotary compressor without causing any deformation in the scroll portion during the knock-out process.

To achieve the above-mentioned objects, according to the present invention, there is provided a method of manufacturing a scroll member for use in a rotary compressor, comprising the steps of heating a material which has been preformed into a substantially frustaconical body consisting of a flat upper surface portion having a cylindrical projection formed in the center portion thereof and a lower surface portion having a conical surface and a flat projecting surface, and then forging the material by a forging apparatus.

In the above-mentioned manufacturing method, the material is subjected to a first heating at a temperature in the range from 100° to 200° C., and then subjected to coating with graphite, and is subsequently subjected to a second heating at a temperature of 440° C.

Further, in the above-mentioned manufacturing method, during the forging process, over-extrusion parts in the scroll portion of the material are subjected to restraints by a counter punch and are allowed to flow into portions which tend to become thin in wall thickness.

Still further, in the above-mentioned manufacturing method, during the process of knocking out the forged product after the completion of extrusion, the outer periphery of the disc shaped portion of the scroll member thus formed by forging is knocked out by means of at least one ring knock-out.

Moreover, in the above-mentioned manufacturing method, during the process of knocking out the forged product after the completion of extrusion, the outer periphery of the disc shaped portion of the scroll member thus formed by forging is knocked out by at least one ring knock-out, and the portions which tend to cause over-extrusion in the scroll portion are knocked out by means of a plurality of arcuate knock-out pieces which correspond in configuration to the scroll portion.

The above and many other advantages, features and additional objects of the present invention will become apparent to those skilled in the art upon making reference to the following detailed description and accompanying drawings in which preferred structural embodiments incorporating the principles of the present invention are shown by way of illustrative example.

DETAILED DESCRIPTION OF THE INVENTION

Figure 1:
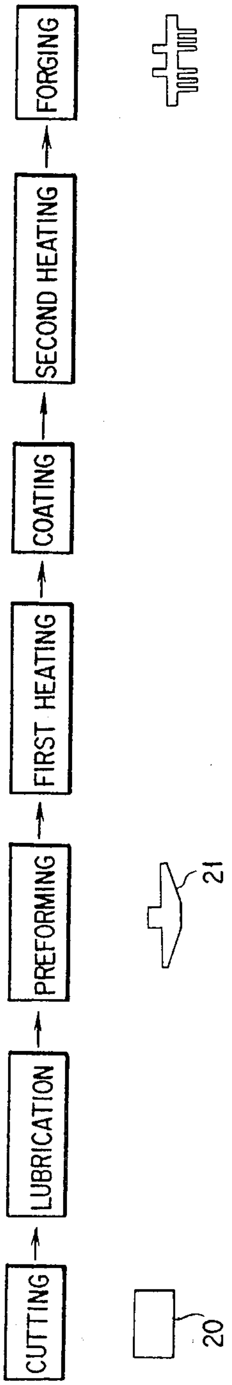
FIG. 1 is an explanatory flow diagram illustrating an example of compressor parts manufacturing processes.

A hot forging apparatus "A" used for processes of manufacturing a scroll member for use in a rotary compressor according to the present invention will first be described below with reference to FIG. 2.

This hot forging apparatus "A" comprises a counter punch 3 mounted by a plate 2 on a base member 1, the counter punch 3 has a ring knock-out 4 mounted on the outer periphery thereof so as to be moved vertically, the actuation of the ring knock-out 4 being made by means of a knock-out pin 5. Reference numeral 16 denotes a die.

Mounted on the side of a slide 15 are a plate 6 and a holder mechanism 7. The holder mechanism 7 holds a ring punch 8 so as to enable it to be moved vertically by an amount l of ring punch cushion. The ring punch has formed therein a spring accommodating recess 19 and a punch insertion hole 10. Mounted inside the recess 19 is a spring 11 arranged to bias the ring punch 8 downwards.

Further, the plate 6 has a pin insertion hole 12 formed therein.

A punch 13 is insertion in the punch insertion holes 10 and 12, and a head portion 14 of the punch 13 is allowed to abut against the slide 15.

Manufacturing processes of a product C, which is a moving scroll member as one of compressor parts, will be described with reference to FIG. 1.

Figure 3:
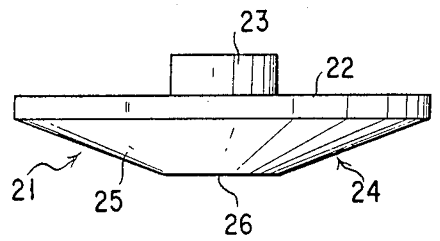
FIG. 3 is a front view of a material to be forged.

A material 20 is cut, lubricated and then preformed into a material 21 having a shape as shown in FIG. 3. The material 21 consists of a flat upper surface portion 22 having a cylindrical projection 23 formed in the center portion thereof, and a frusta-conical lower surface portion 24 having a conical surface 25 and a flat projecting surface 26.

The material 21 is subjected to a first heating at a temperature in the range from 100° to 200° C., and then subjected to coating with graphite. Subsequently, it is subjected to a second heating at a temperature of 440° C., and then finished into a product by forging by means of the above-mentioned forging apparatus "A".

Figure 4:
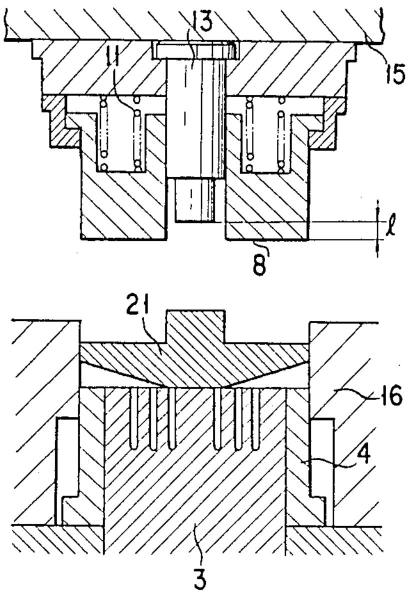
FIGS. 4, 5 and 6 are explanatory views of forging processes.
Figure 5:
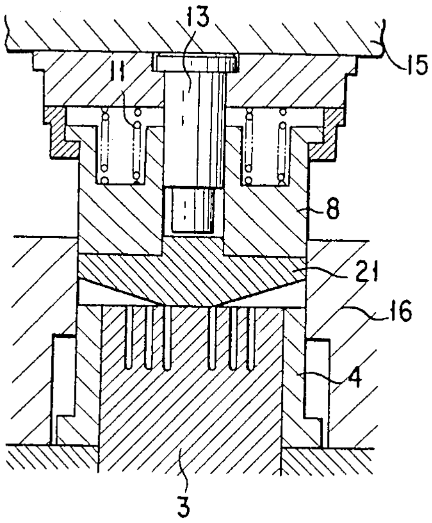
Figure 6:
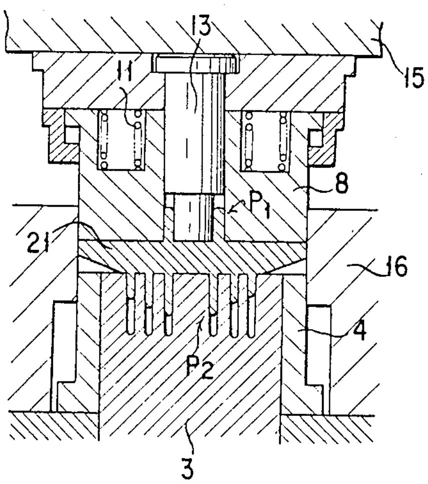

The forging processes are shown in FIGS. 4, 5 and 6.

When the slide 15 has been raised to its upper position, the ring punch 8 is located lower than the punch 13 by an amount l of ring cushion, and the aforementioned material 21 is inserted in the die 16. (Refer to FIG. 4.)

Subsequently, the slide 15 is moved down to allow the ring punch 8 to abut against the material 21. (Refer to FIG. 5.)

With further downward movement of the slide 15, while the spring 11 is being compressed, the ring punch 8 is allowed to float in its position, during which the punch 13 is allowed to intrude into the material 21 with resultant commencement of rearward extrusion of a portion $P_1$ of the material 21 together with simultaneous commencement of forward extrusion. (Refer to FIG. 6.)

Upon completion of the compression of the spring 11, the punch 13 and the ring punch 8 will begin to move down at the same time to cause forward extrusion of a scroll portion $P_2$.

Figure 8:
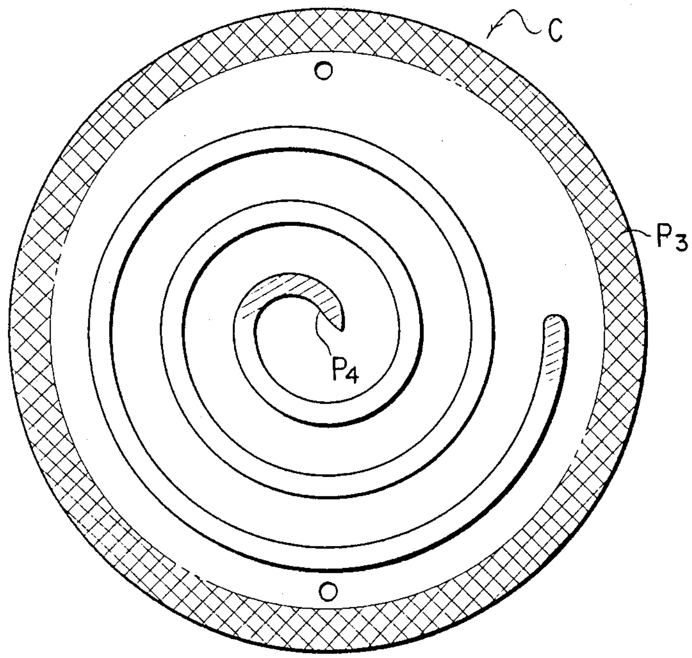
FIG. 8 is a plan view of the same.

Since, during forward extrusion, a region $P_4$ in the scroll portion shown in FIG. 8 is liable to become thin in wall thickness, arrangement is made such that the counter punch 3 acts to restrain over-extrusion parts to cause flow of a part of the material 21 into the portion $P_4$ which tends to become thin to thereby prevent the occurrence of the thin walled portion.

Figure 2:
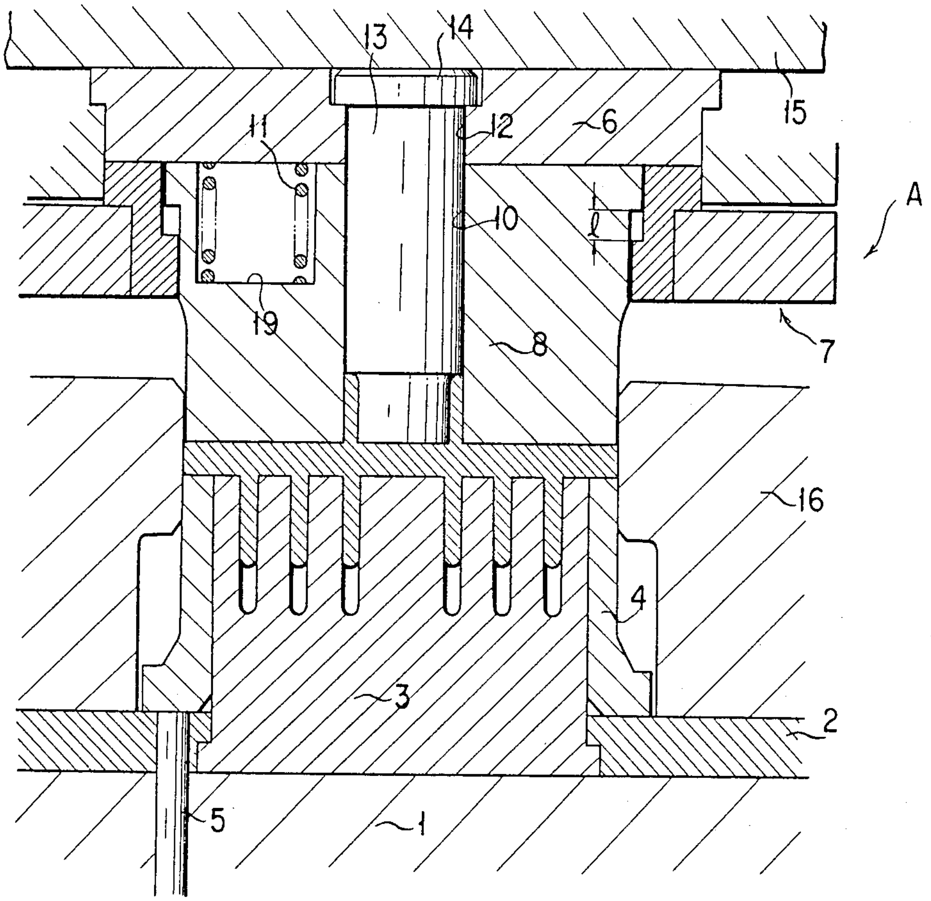
Fig. 2 in an explanatory view of the construction of a forging apparatus.
Figure 7:
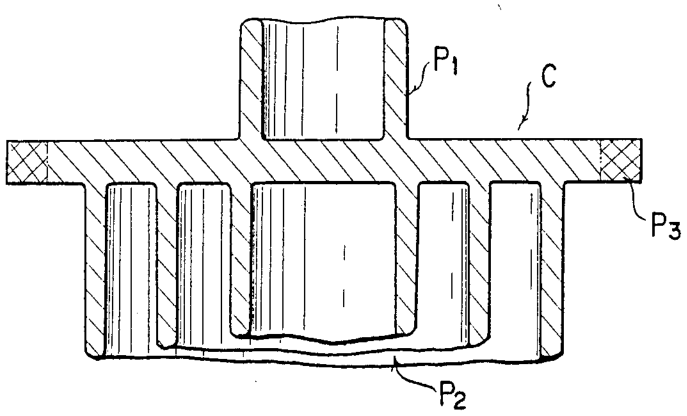
FIG. 7 is a longitudinal sectional view of a finished product.

Whilst, upon completion of the extrusion of the material 21, the slide 15 is first moved upwards together with the ring punch 8 and the punch 13 from the position shown in FIG. 2. Subsequently, the knock-out pin 5 is actuated to push up the ring knock-out 4 to allow the product C to be knocked out from within the counter punch 3. The arrangement is made such that the peripheral part of the product C (portion $P_3$ designated by netted lines in FIGS. 7 and 8) is pushed up by the ring knock-out 4.

This arrangement is made to avoid warping or deformation of the product C which tends to occur during the knock-out process, because, in case the leading end of scroll portion in the product C is knocked out, the length of the formed leading end of the scroll portion after forming is not always constant.

Further, the portion $P_3$ designated by netted lines is cut off after the forging process for finishing it into a complete product C, but this portion $P_3$ is used to clamp the product C when the scroll portion is being machined.

In brief, if the scroll part of the product C is machined, with the portion $P_3$ designated by netted lines being clamped, and then the portion $P_3$ is cut off, it is possible to ensure that the finished product has no scratch or flaw.

Figure 9:
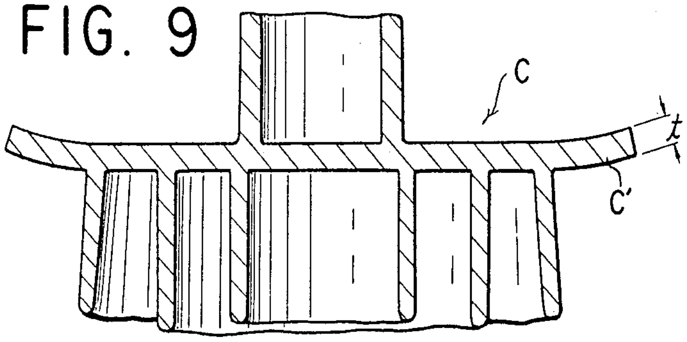
FIG. 9 is a sectional view of a product with deformation caused by knock down.

Whilst, in case the wall thickness t of the disc shaped portion of the product obtained by the above-mentioned forging processes is relatively thick, the above-mentioned knock-out method will not deformation in the resultant product C, but in case the thickness t of the disc shaped portion is thin, a deformation C' as shown in FIG. 9 may occur in the product C during the knock-out process.

Figure 10:
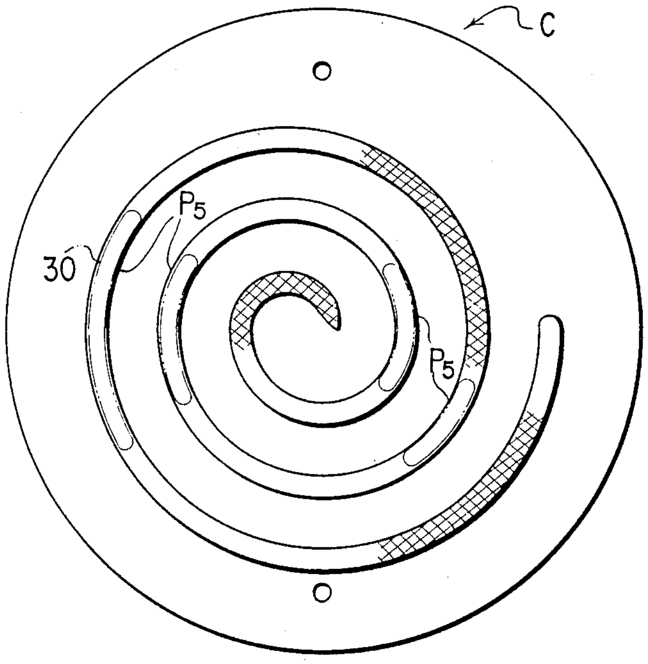
FIGS. 10 and 11 are a bottom view of a product explaining an arrangement of knock-out for the prevention of deformation, and a perspective view showing the shape of the knock-out, respectively.
Figure 11:
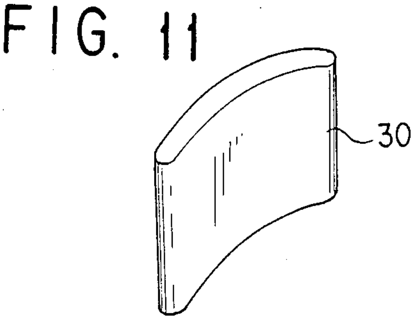

To avoid the above-mentioned disadvantage, according to the present invention, arrangement is made such that arcuate knock-out pieces 30, which correspond in shape to the scroll as shown in FIG. 11 are mounted on portions which tend to cause over-extrusion (portion $P_5$ in FIG. 10) excluding the portions of the scroll portion designated by netted lines which tend to become thin in wall thickness, and the knock-out pieces 30 are adapted to be pushed up together with the ring knock-out 4 to thereby knock out the product C during the knock-out process. This arrangement not only enables even the product C having a thin walled disc portion to be knocked out without causing any deformation, but also eliminates the possibility of warping or deformation in the product C at the time of knock-out, because of the configuration of the knock-out pieces 30 corresponding to the shape of the scroll.

It is to be understood that the foregoing description is merely illustrative of the preferred embodiment of the present invention and that the scope of the invention is not to be limited thereto. Additional modifications or alterations of the present invention will readily occur to those skilled in the art without departing from the scope of the invention.

What is claimed is:

1. A method of manufacturing a scroll member for use in a rotary compressor, comprising the steps of:

heating a material which has been preformed into substantially frusta-conical body consisting of a flat upper surface portion having a cylindrical projection formed in the center portion thereof and consisting of a lower surface portion having a conical surface and a flat projecting bottom surface; and forging the material by a forging apparatus to apply a backward and forward extrusion to the material.

2. The manufacturing method as set forth in claim 1, wherein said material is subjected to a first heating at a temperature in the range from 100° to 200° C., and then subjected to coating with graphite, and is subsequently subjected to a second heating at a temperature of 440° C.

3. The manufacturing method as set forth in claim 1, wherein during the forging process, over-extrusion parts of the scroll portion of said material are subjected to restraints by a counter punch and are allowed to flow into portions which tend to have a thin wall thickness.

4. The manufacturing method as set forth in claim 1, wherein during the process of knocking out of forged product after the completion of extrusion, the outer periphery of the disc-shaped portion of the scroll member thus formed by forging is knocked out by means of at least one ring knock-out.

5. The manufacturing method as set forth in claim 1, wherein during forging process of knocking out the forged product after the completion of extrusion, the outer periphery of the disc-shaped portion of the scroll member thus formed by forging is knocked out by means of at least one ring knock-out, and the portions which tend to cause over-extrusion in the scroll portion are knocked out by means of a plurality of knock-out pieces which correspond in configuration to the scroll portion.

* * * * *